US007002640B2

(12) United States Patent
Jung (10) Patent No.: US 7,002,640 B2
(45) Date of Patent: Feb. 21, 2006

(54) APPARATUS FOR MOUNTING A SCREEN IN A PROJECTION TELEVISION

(75) Inventor: Young-jun Jung, Daegu (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 525 days.

(21) Appl. No.: 10/234,340

(22) Filed: Sep. 5, 2002

(65) Prior Publication Data

US 2003/0112379 A1    Jun. 19, 2003

(30) Foreign Application Priority Data

Dec. 19, 2001    (KR) ............................... 2001-81349

(51) Int. Cl.
*H04N 5/64*    (2006.01)

(52) U.S. Cl. ................. 348/787; 348/789; 248/220.21; 248/918

(58) Field of Classification Search ................ 348/787, 348/789; 312/7.2, 223.1, 223.2; 353/74, 353/79, 119; 248/475.1, 489, 497, 205.1, 248/214, 215, 220.21, 220.22, 304, 917, 248/918; 359/450, 460
See application file for complete search history.

(56) References Cited

U.S. PATENT DOCUMENTS

| 5,592,241 | A | * | 1/1997 | Kita et al. ................... 348/823 |
| 5,697,687 | A | * | 12/1997 | Coleman et al. ............. 353/122 |
| 6,459,531 | B1 | * | 10/2002 | Min ........................... 359/450 |
| 6,469,752 | B1 | * | 10/2002 | Ishikawa et al. ............ 348/834 |

FOREIGN PATENT DOCUMENTS

CN    1300162 A    6/2001

* cited by examiner

*Primary Examiner*—Victor R. Kostak
(74) *Attorney, Agent, or Firm*—Sughrue Mion, PLLC

(57) ABSTRACT

A screen fastening device of a projection television having a front cabinet including a front window of a case, a screen for penetrating or forming an image, a fastening bracket for fastening the screen to the front cabinet, a mating portion for removably fastening the fastening bracket, which has one or more hooking protrusions formed on the fastening bracket, and a hooking protrusion receiving portion formed on the front cabinet to correspond to the hooking protrusion, to the front cabinet, and a supporting member for supporting and holding the fastening bracket for the mating portion to firmly fasten the fastening bracket to the front cabinet is provided. The screen fastening device can improve the workability and productivity as it can fasten or unfasten without using screws on the front surface of the projection television by the mating portion and the supporting member.

8 Claims, 7 Drawing Sheets

APPARATUS FOR MOUNTING A SCREEN IN A PROJECTION TELEVISION

BACKGROUND OF THE INVENTION

1. Field of the Invention

The present invention relates to an apparatus for mounting a screen in a projection television, and more particularly, to the apparatus for mounting or separating the screen on or off the front surface of the projection television without using screws. The present application is based on Korean Patent Application No. 2001-81349, which is incorporated herein by reference.

2. Description of the Related Art

Figure 1:
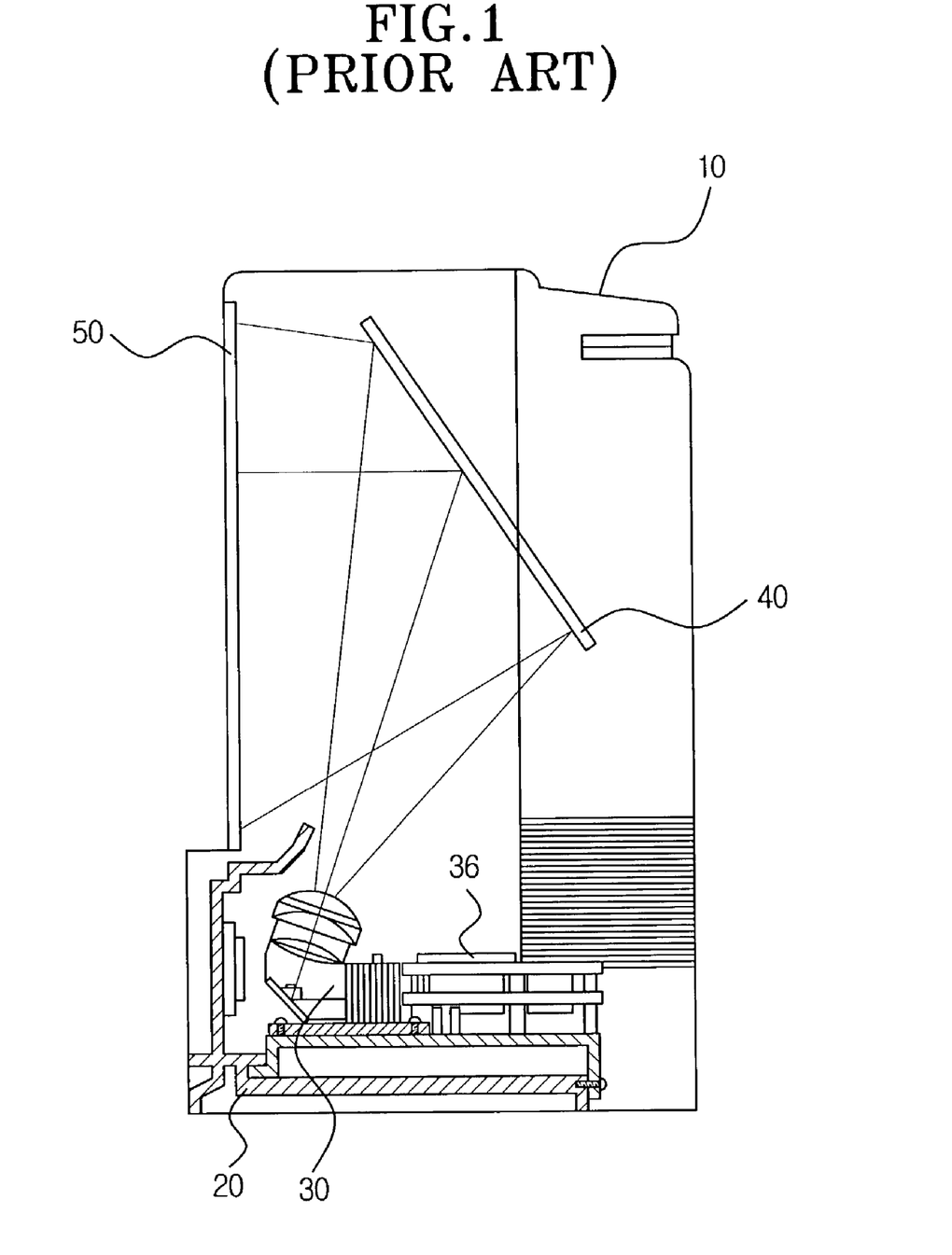
FIG. 1 is a sectional view of a structure of a projection television.

Generally, as shown in FIG. 1, a projection television comprises an optical system 30 disposed in the cabinet 20 in the lower case for generating an image by selectively penetrating a laser beam generated in a light source through a liquid crystal display (LCD) element and for enlarging and penetrating the image through a projection lens; a reflex mirror 40 disposed in the back of the upper part of the case 10 to tilt in a predetermined degree to reflect the image enlarged in the optical system 30 in the front surface; and a screen 50 disposed on the front surface of the upper case 10 to be exposed to the outside for penetrating or forming the image reflected by the reflex mirror 40.

Figure 2:
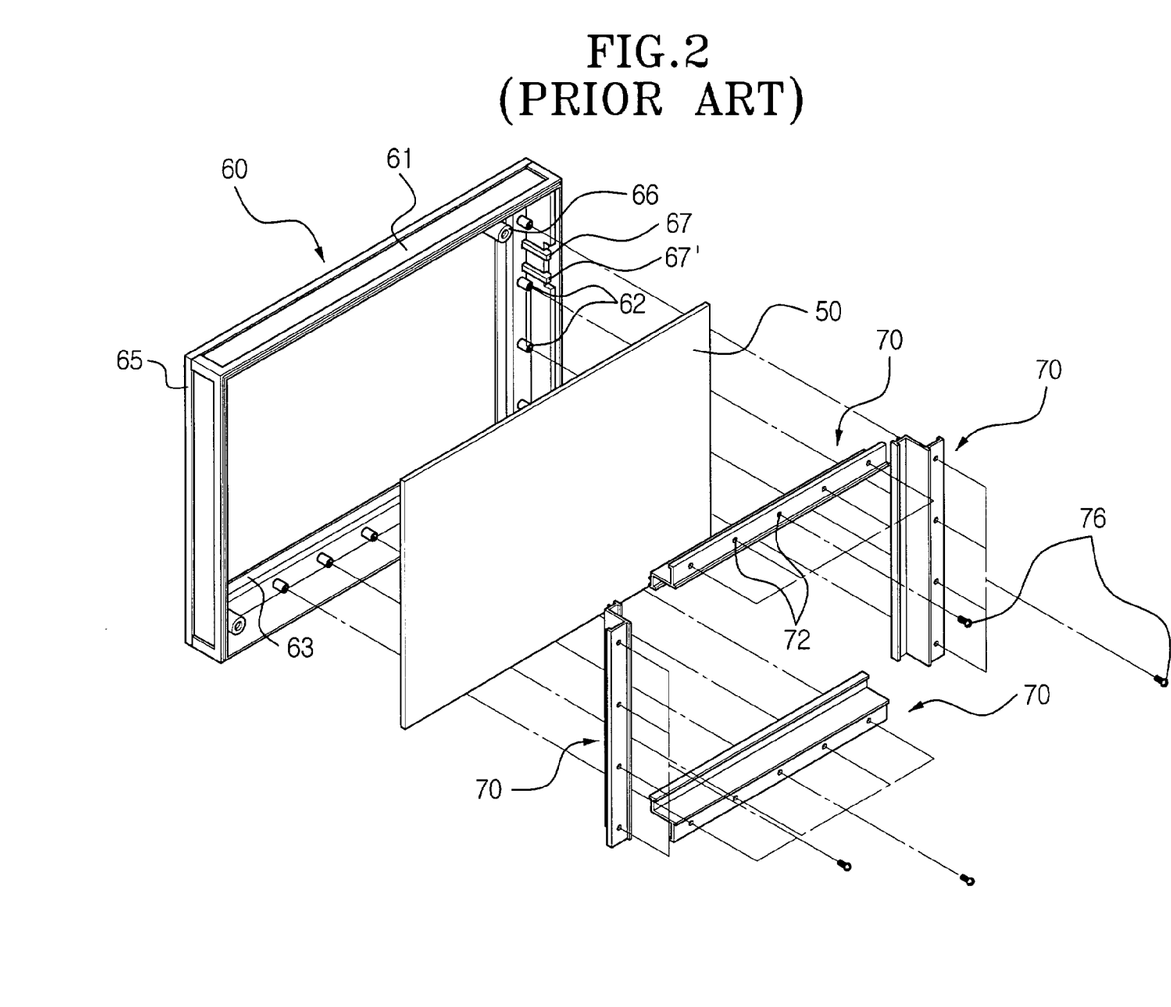
FIG. 2 is an exploded perspective view of a screen fastening device of a conventional projection television.

Among these structural parts of the projection television, the screen 50 is fastened to the case 10 by a screen fastening device 1, as shown in FIG. 2.

The screen fastening device 1 comprises a front cabinet 61 forming a front window of the case 10 and a fastening bracket 70 for fastening the screen 50 to the front cabinet 60 using a number of screws 76.

The front cabinet 60 comprises a rectangular shape inner frame 61 supporting and holding the back of the screen 50 by the fastening bracket 70 and an outer frame 65 supporting and holding the front of the screen 50 by being combined with the inner frame 61.

Figure 3:
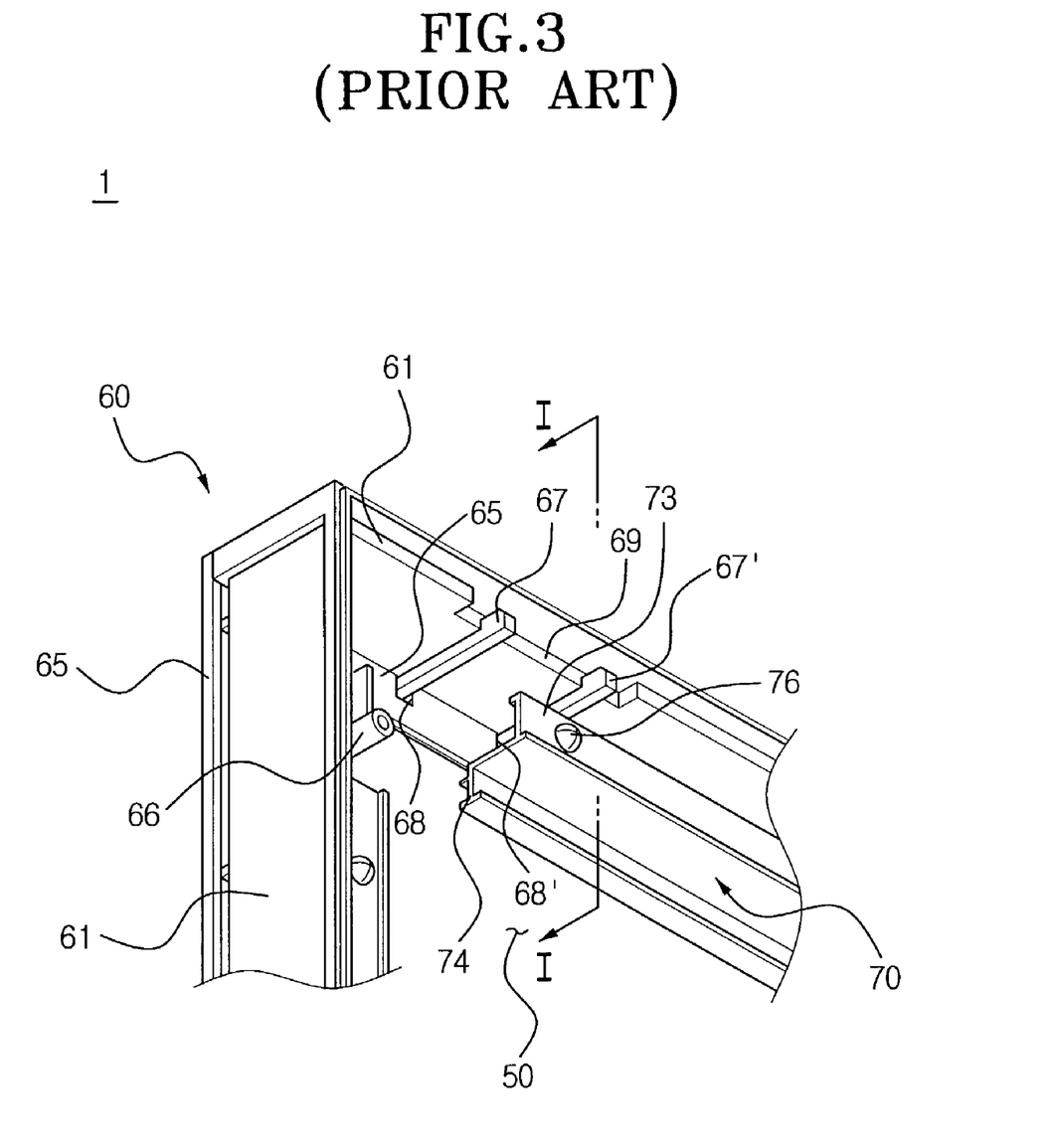
FIG. 3 is a partial perspective view of a conventional screen fastening device.
Figure 4:
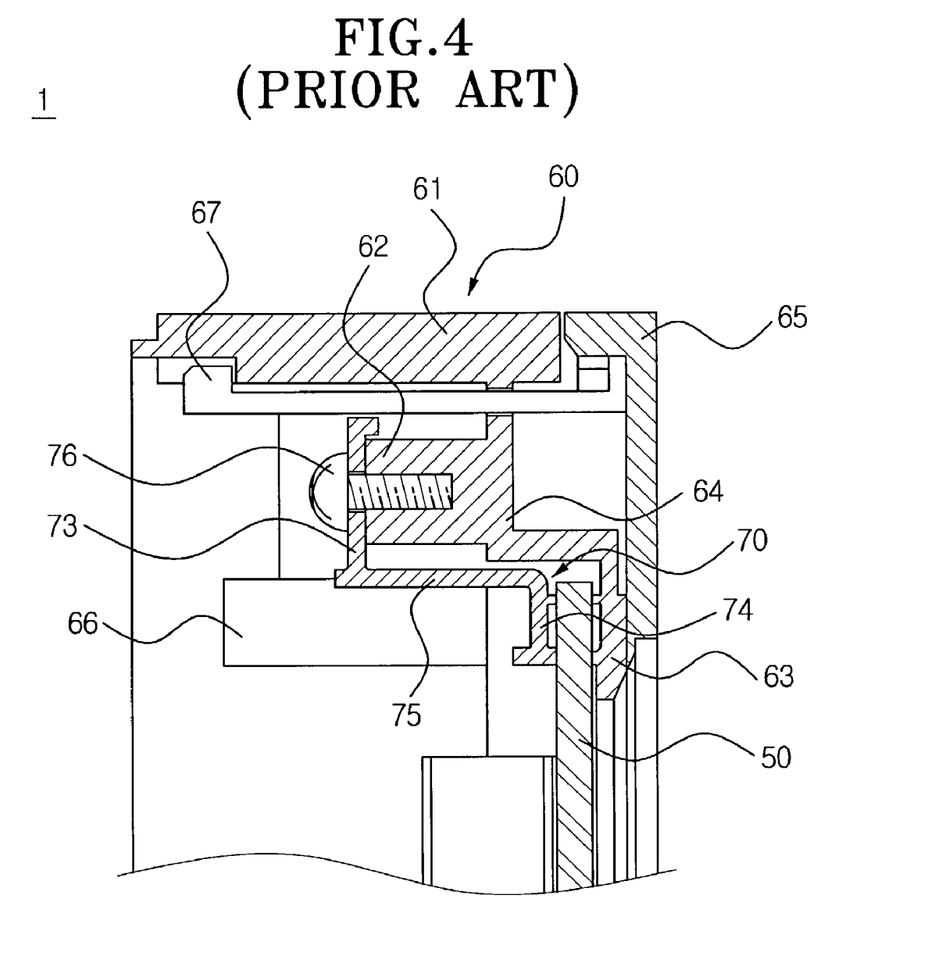
FIG. 4 is a partial sectional view of a screen fastening device cut along the line I—I of FIG. 3.

As shown in FIGS. 3 and 4, the inner frame 61 comprises a screen receiving portion 63 for receiving and supporting the screen 50, and a fastening portion 64 having a number of screw bosses formed at predetermined intervals for fastening the fastening bracket 70 with screws 76 and also having four fastening bosses 66 at each corner of the front cabinet 60 for fastening the front cabinet 60 to the fastening portion (not shown) of the case 10. The outer frame 65 has a number of hooks 67, 67' being hooked at the groove 69 through holes 68, 68' formed on the inner frame 61 for hooking and fastening the inner frame 61.

Each fastening bracket 70 has a supporting portion 74 for supporting the screen 30, a fastening portion 73 having a number of screw holes through which the screws 76 pass to be inserted in the screw bosses 62 for fastening the fastening bracket 70 to the inner frame 61, and a connection portion 75 for connecting the supporting portion 74 with the fastening portion 73. The number of fastening brackets 70 which are r-shaped bars is four.

The conventional screen fastening device 1 described as above is assembled as below:

First of all, the outer frame 65 is disposed to the inner frame 61 as the hooks 67, 67' pass through the through holes 68, 68' of the inner frame 61 and hooked at the groove 69 and the screen 50 is disposed on the inner frame 61 for the front surface to contact with the screen receiving portion 63 of the inner frame 61 of the front cabinet 60.

The fastening bracket 70 is then placed on the back of the screen 50 and on the fastening portion 64 of the inner frame 61 for the supporting portion 74 to press the back of the screen 50 and for the screw holes to correspond to the screw bosses 62 of the inner frame 61.

The screws 76 are then put in the screw bosses 62 through the screw holes 72 of the fastening portion 74 for fastening the screen 50 to the inner frame 61 and the assembling can be completed when the inner frame 61 is fastened to the fastening part of the case 10 by the fastening bosses 66 and screws.

In case the screen is to be disassembled for repair or replacement, a cover (not shown) comprising the back of the projection television case 10 is separated first, and then the screen 50 is assembled by reversing the assembling process of the screen fastening device 1 described above.

However, the conventional screen fastening device 1 assembled and disassembled as above description has a problem of losing work efficiency and productivity as a large number of screws, for example 16 to 20 screws 76, are used for fastening the screen 50 to the inner frame 61.

Furthermore, in case the screen 50 is disassembled for repair or replacement, disassembling is complicated and takes a long time as the cover comprising the back of the projection television case 10 should be separated before the screws are fastened in the screw bosses 65 of the inner frame 61.

SUMMARY OF THE INVENTION

In order to solve the above described problems, the present invention is developed to provide a screen fastening device of the projection television having the workability and productivity improved by enabling the screen to be fastened or unfastened to the front surface of the projection television without using screws.

In order to achieve the above aspect, the screen fastening device comprises a front cabinet including a front window of a case, a screen for penetrating or forming an image, one or more fastening brackets for fastening the screen to the front cabinet, a mating portion for removably fastening the fastening bracket, which has one or more hooking protrusions formed either on the front cabinet or on the fastening bracket, and a hooking protrusion receiving portion formed either on the fastening bracket or on the front cabinet to correspond to the hooking protrusion, to the front cabinet, and a supporting member for supporting and holding the fastening bracket for the mating portion to firmly fasten the fastening bracket to the front cabinet.

In an exemplary embodiment, the supporting member comprises a supporting member fastening portion for removably fastening the supporting member to the fastening bracket. The supporting member fastening portion comprises one or more protrusions formed either on the fastening bracket or on the supporting member, and a protrusion receiving portion formed either on the supporting member or on the fastening bracket to correspond to the protrusion. Selectively, the supporting member fastening portion may have cuts formed on the supporting member around both sides of a part forming either the protrusion or the protrusion receiving portion for helping the protrusion to fit in the protrusion receiving portion.

The front cabinet comprises a recess having a long groove for letting the hooking protrusion pass through and holding the same and receiving a part of the supporting member forming the supporting member fastening portion and supporting the same. The supporting member is in the form of rectangular frame composing an exterior of the projection television together with the front cabinet.

Selectively, the hooking protrusion receiving portion of the mating portion comprises a surface of the recess which the hooking protrusion is hooked on, and a number of guiding grooves formed on the sidewall of the recess and a surface near the recess, where the hooking protrusion is hooked on, for guiding the hooking protrusion of the fastening bracket for the hooking protrusion to be inserted until the same level as the level of the rear of the recess of the front cabinet. In addition, the mating portion comprises a stopper formed on the rear surface of the recess to meet with at least one hooking protrusion of the fastening bracket for restricting movement of each fastening bracket after the hooking protrusion hooks on the rear surface of the recess.

BRIEF DESCRIPTION OF THE DRAWINGS

The aforementioned aspect and characteristic of the present invention will be more apparent by describing an illustrative, non-limiting embodiment of the present invention with reference to the accompanying drawings, in which.

DESCRIPTION OF ILLUSTRATIVE, NON-LIMITING EMBODIMENT

Hereinafter, an illustrative, non-limiting embodiment of a screen fastening device of a projection television according to the present invention will be described in greater detail with reference to the accompanying drawings.

Figure 5:
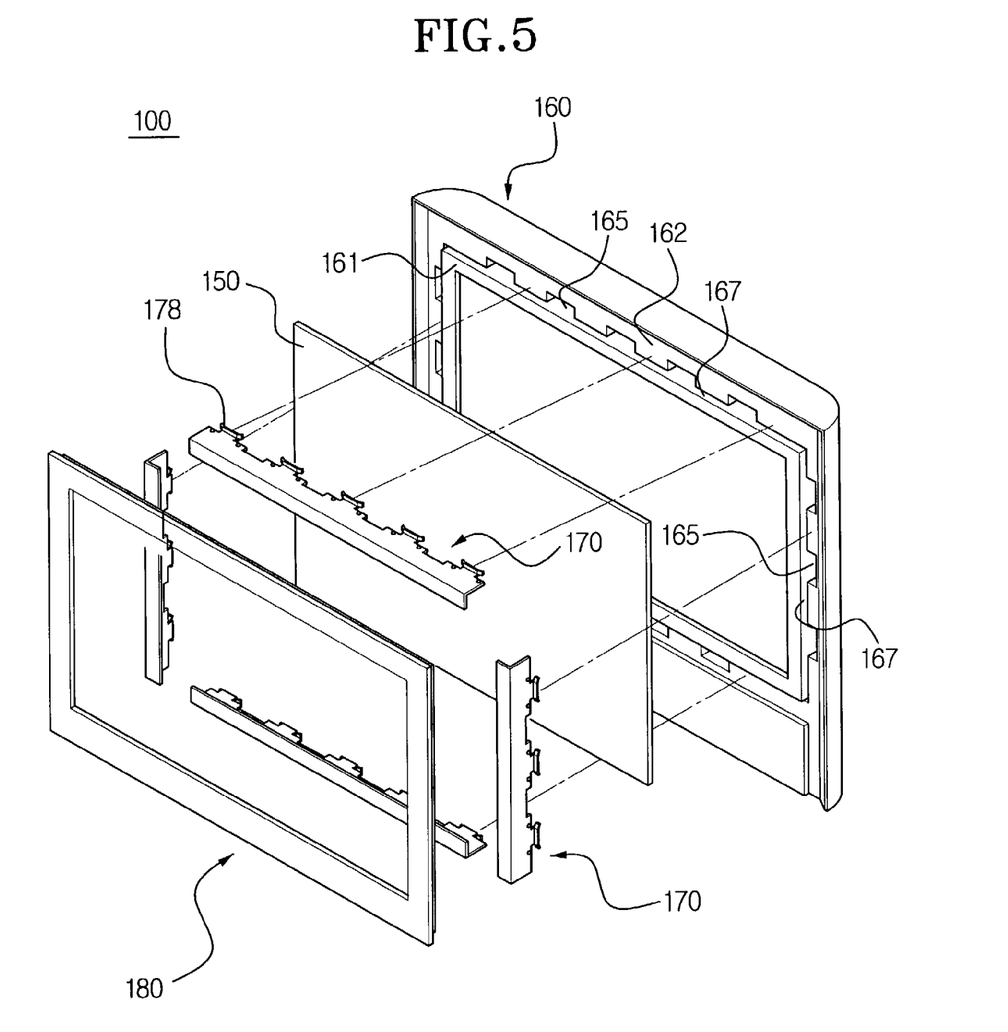
FIG. 5 is an exploded perspective view of a screen fastening device of the present invention.

Referring to FIG. 5, a projection television according to the present invention comprises a screen 150 for penetrating and forming an image, and a screen fastening device 100 for fastening the screen 150 to a case (not shown).

Figure 6:
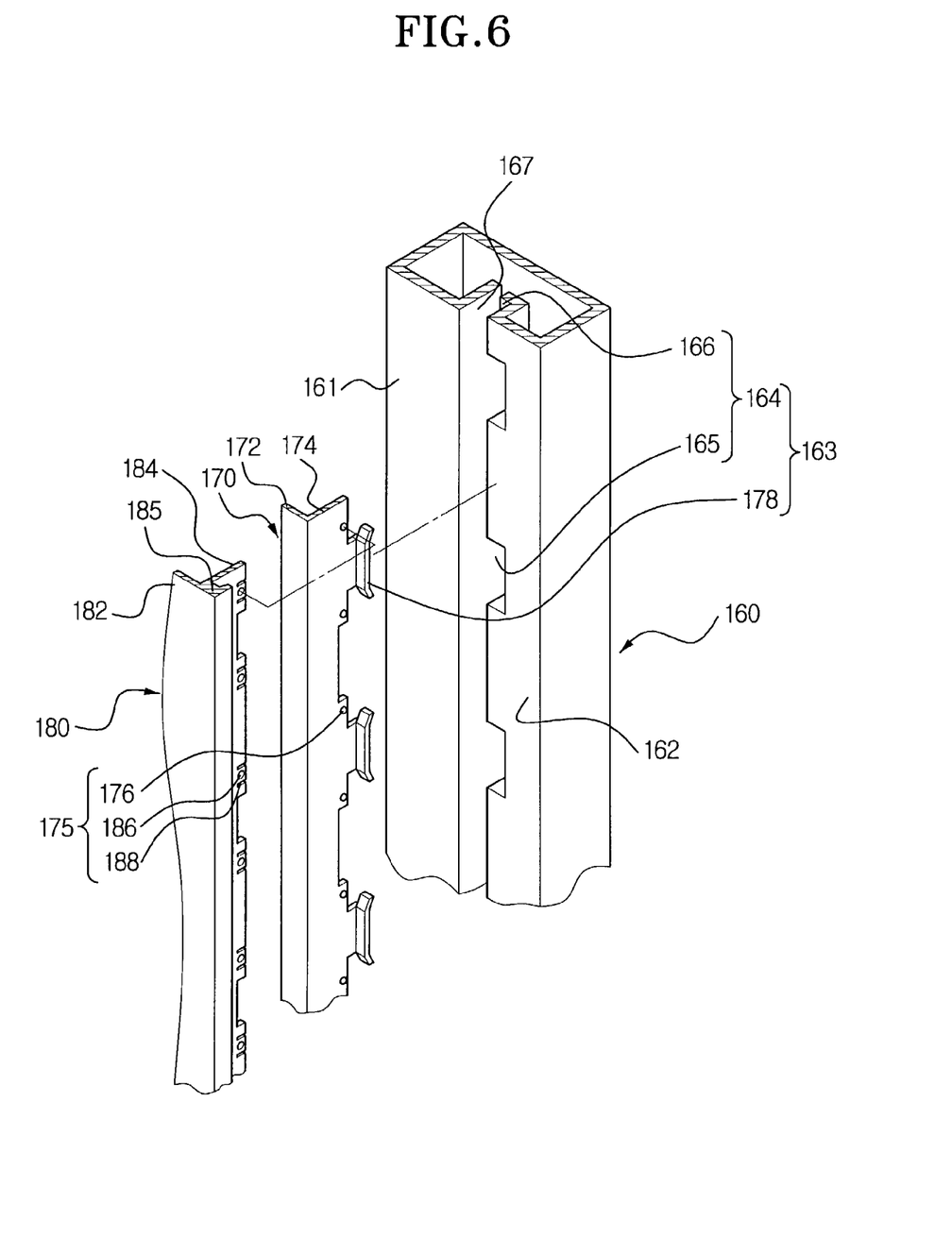
FIG. 6 is a partial perspective of one side of the screen fastening device in FIG. 5.
Figure 7:
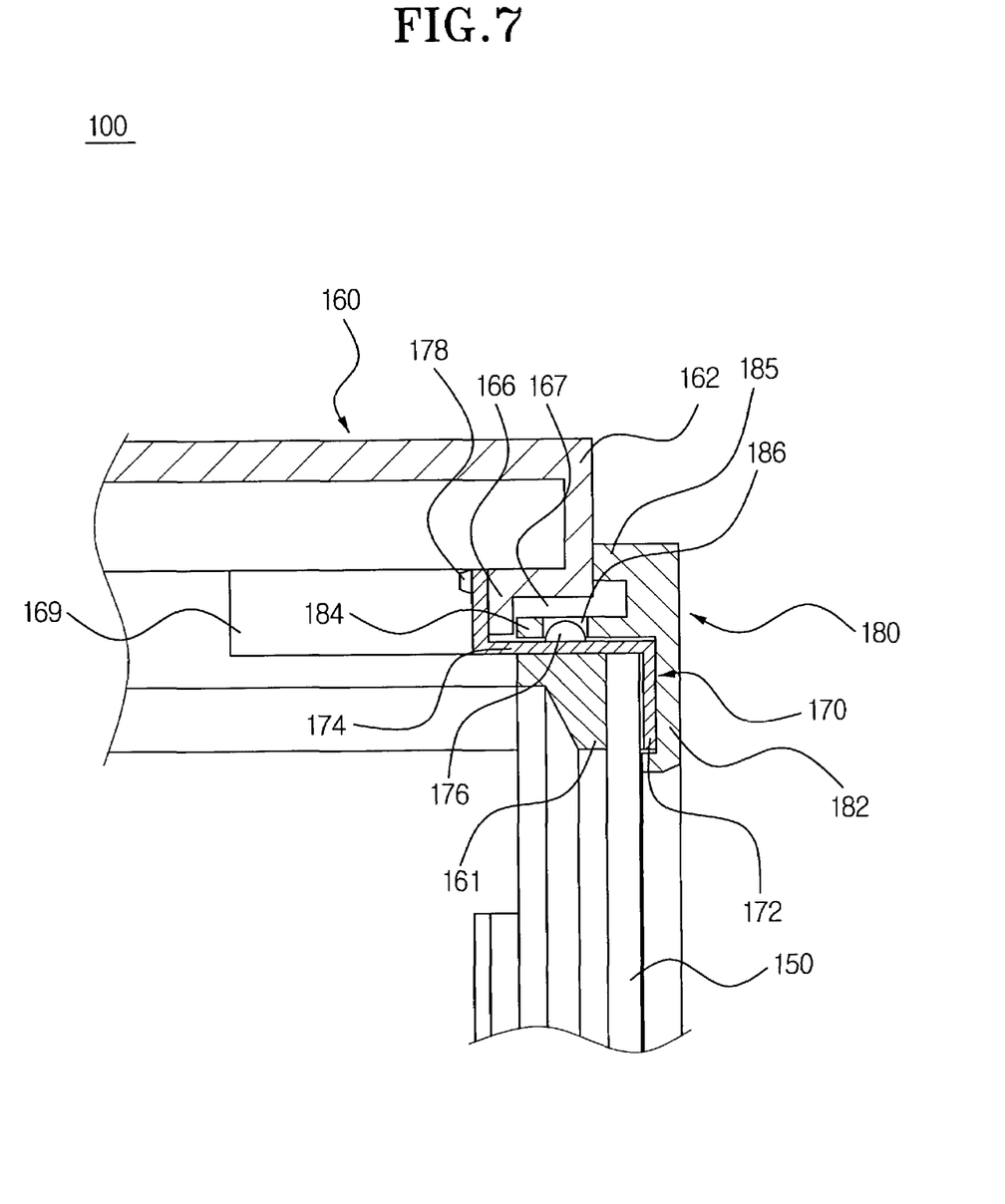
FIG. 7 is a partial sectional view of a screen fastening device of the present invention.

As shown in FIGS. 6 and 7, the screen fastening device 100 comprises a front cabinet 160 including the front window of the case, a fastening bracket 170 for fastening the screen 150 to the front cabinet 160, a mating portion 163 for removably fastening the fastening bracket 170 to the front cabinet 160, a supporting member 180 for supporting and holding the fastening bracket 170 for the mating portion 163 to firmly fasten the fastening bracket 170 to the front cabinet 160, and a supporting member fastening portion 175 for removably fastening the supporting member 180 to the fastening bracket 170.

The front cabinet 160 formed of a rectangular shape frame comprises an inner supporting portion 161 supporting the back of the screen 150, an outer supporting portion 162 supporting a second extended supporting portion 185 of a supporting member 180, which will be described later, and a recess 166 formed in between the inner supporting portion 161 and the outer supporting portion 162 to form a long groove 167 for letting a hooking protrusion 178 and a fastening portion 174 of the fastening bracket 170 forming the hooking protrusion 178, which is described later, through and for receiving an extended fastening portion 184 of the supporting member 180 and supporting the same.

There are four L-shaped fastening brackets 170, each of which has a supporting portion 172 for supporting the screen 150, a fastening portion 174 extended to pass through the groove 167 of the front cabinet 160.

The mating portion 163 comprises a number of hooking protrusions 178 protruding from the fastening portion 174 of the fastening bracket 170 at predetermined intervals perpendicularly to the fastening portion 174 for hooking over the rear of the recess 166, and a hooking protrusion receiving portion 164 formed in the recess 166 of the front cabinet 160 for receiving the hooking protrusion 178 and being hooked on. The hooking protrusion receiving portion 164 comprises a number of guiding grooves 165 for guiding the hooking protrusion 178 of the fastening bracket 170 for the hooking protrusion 178 to be inserted until the same level as the level of the rear of the recess 166, and a surface of the recess 166 which the hooking protrusion 178 is hooked on.

At the back of the recess 166 is provided is at least one stopper (not shown) per L-shaped frame composing the fastening bracket 170 for restricting the movement of the fastening bracket 170, i.e., a protrusion blocking the bottom end or the rightmost hooking protrusion 178, after the hooking protrusion 178 is hooked on the rear of the recess 166. The guiding grooves 165 are formed in a predetermined distance away from the side wall of the recess 166.

It is preferable that the length of the L-shaped frame composing the fastening bracket 170 shorter than the width or the length of the corresponding groove 167 in at least as much as the width of the guiding groove 165 and/or the hooking protrusion 178 in order for the fastening bracket 170 hooking the recess 166 to move after the hooking protrusion 178 is inserted in the guiding groove 165.

Accordingly, when the fastening portion 174 of the fastening bracket 170 is inserted in the groove 167 for fastening the screen 150 to the front cabinet 160, the fastening brackets 170 are first inserted through the guiding grooves 165 and then moved to be hooked on the rear of the recess 166, for example, from the top to the bottom (FIG. 6) or from the left to the right, and be fastened to the front cabinet 160. In addition, when the fastening portions 174 of the fastening bracket 170 are taken out of the groove 167, the fastening bracket is first moved from the bottom to the top or from the right to the left, as opposed to when the fastening bracket 170 was fastened, towards the position of the guiding grooves to be released from the rear of the recess 166 and then taken out of the groove 167.

The supporting member 180 is composed of a rectangular frame comprising a first extended supporting member 182 for supporting the front surface of the screen 150, a second extended supporting member 185 extended to contact the outer supporting portion 162 of the front cabinet 160, and an extended fastening portion 184 received by the recess 166 of the front cabinet 160 and supported. The supporting member 180 functions not only as supporting and binding the fastening bracket 170 but also as composing the exterior of the projection television together with the front cabinet 160.

The supporting member fastening portion 175 has a number of protrusions 176 formed on the fastening portion 174 of the fastening bracket 170 at the predetermined intervals, and a number of holes 186 formed on the extended fastening portion 184 of the supporting member 180 corresponding to the protrusions 176. The supporting members 175 comprise a number of cuts 188 formed on both sides of the holes 186 for helping the protrusions 176 to fit in the holes 186.

Therefore, when the supporting member 180 is inserted in the groove 167 of the front cabinet 160 and then the protrusions 176 are fastened to the holes 186, the fastening bracket 170 supports the screen 150 to be firmly fastened to the front bracket 160 by the extended fastening portion 184.

The screen fastening device 100 of the projection television according to the present invention structured as above can be described below referring to FIGS. 5 and 7.

First of all, the four rear edges of the screen 150 are placed on the inner supporting portion 161 of the front cabinet 160. Then, the four L-shaped frames forming the fastening brackets 170 are placed on appropriate positions for the hooking protrusions 178 to be inserted through the guiding grooves 165 and inserted into the groove 167. The fastening bracket 170 is moved for the hooking protrusions 178 to be hooked on the rear of the recess 166, for example, from the top to the bottom or from the left to the right, until the bottom end or the rightmost hooking protrusion 178 of the fastening bracket 170 is stopped by the corresponding stopper, and is fastened to the front cabinet 160.

After the fastening bracket 170 is fastened to the front cabinet 160, the supporting member 180 is positioned for the protrusions 176 to be fastened in the holes 186 and the supporting member 180 is inserted into the groove 167. As the supporting member 180 is inserted into the groove 167, the protrusions 186 are fastened to the holes, as shown in FIG. 7, the supporting member 180 supports the fastening bracket 170 to firmly fasten the screen 150 to the front bracket 160 through the first extended supporting portion 182 and the extended fastening portion 184, and finally the assembling is completed.

In case the screen has to be disassembled as the screen 150 needs to be replaced or repaired or the interior parts of the projection television are to be repaired, the supporting member 180 is pulled out for the protrusions 176 to be unfastened from the holes 186.

After the supporting member 180 is separated from the groove 167 of the front cabinet 160 as the protrusions 176 are unfastened from the holes 186, the L-shaped frames composing the fastening brackets 170 are moved from the bottom to the top or from the right to the left to unhook the hooking protrusions 178 off the rear of the recess 166 and to place them corresponding to the guiding grooves 165. When the hooking protrusions 178 are placed corresponding to the guiding grooves 165, the fastening bracket 170 can be released from the groove 167 of the front cabinet 160.

When the fastening bracket 170 is released, the screen 150 can be easily removed for replacement or repair of the screen 150, or repair of the projection television's interior parts.

Although the preferred embodiments of the present invention have been described, it will be understood by those skilled in the art that the present invention should not be limited to the described preferred embodiments. Various changes and modifications can be made within the sprit and scope of the present invention as defined by the appended claims.

As described above, the screen fastening device of the projection television according to the present invention can provide an effect of improving the workability and productivity as it can fasten or unfasten without using screws on the front surface of the projection television.

What is claimed is:

1. A screen fastening device of a projection television, comprising:
   a front cabinet including a front window of a case;
   a screen for penetrating or forming an image;
   at least one fastening bracket for fastening the screen to the front cabinet;
   a mating portion for removably fastening the fastening bracket, which has at least one hooking protrusion formed either on the front cabinet or on the fastening bracket, and a hooking protrusion receiving portion formed either on the fastening bracket or on the front cabinet to correspond to the hooking protrusion, to the front cabinet; and
   a supporting member for supporting and holding the fastening bracket for the mating portion to firmly fasten the fastening bracket to the front cabinet.

2. The screen fastening device of a projection television in claim 1, wherein the supporting member comprises a supporting member fastening portion for removably fastening the supporting member to the fastening bracket.

3. The screen fastening device of a projection television in claim 2, wherein the supporting member fastening portion comprises at least one protrusion formed either on the fastening bracket or on the supporting member, and a protrusion receiving portion formed either on the supporting member or on the fastening bracket to correspond to the protrusion.

4. The screen fastening device of a projection television in claim 3 wherein the supporting member fastening portion has cuts formed on the supporting member around both sides of a part forming either the protrusion or the protrusion receiving portion for helping the protrusion to fit in the protrusion receiving portion.

5. The screen fastening device of a projection television in claim 1, wherein the front cabinet comprises a recess having a groove for letting the hooking protrusion pass through and holding the same and receiving a part of the supporting member forming the supporting member fastening portion and supporting the same.

6. The screen fastening device of a projection television in claim 5, wherein the supporting member has a rectangular frame including an exterior of the projection television.

7. The screen fastening device of a projection television in claim 5, wherein the hooking protrusion receiving portion of the mating portion comprises a surface of the recess which the hooking protrusion is hooked on, and a plurality of guiding grooves formed on the sidewall and the surface of the recess near the surface of the recess, where the hooking protrusion is hooked on, for guiding the hooking protrusion of the fastening bracket for the hooking protrusion to be inserted until the same level as the level of the rear of the recess of the front cabinet is reached.

8. The screen fastening device of a projection television in claim 7, wherein the mating portion comprises a stopper formed on the rear surface of the recess to meet with at least one hooking protrusion of the fastening bracket for restricting movement of the fastening bracket after the hooking protrusion hooks on the rear surface of the recess.

* * * * *